United States Patent [19]
Konovalov et al.

[11] 3,753,015
[45] Aug. 14, 1973

[54] ROTOR WINDING FOR AN ELECTRICAL MACHINE

[76] Inventors: Boris Leonidovich Konovalov, 603 Mikroraion, I, kv. 346; Boris Volkovich Spivak, ulitsa Kosiora, 56, kv. 55; Leonid Vasilievich Ugrjumov, pereulok Faninsky, 3, kv. 39; Alexandr Abramovich Chigirinsky, ulitsa Kuibysheva, II, kv. 8; Evgeny Khaimovich Glider, prospekt Ordzhonikidze, 18, kv. 55; Oleg Borisovich Gradov, ulitsa Kosiora, 6, kv. I; David Bentsionovich Karpman, ulitsa Frantisheka Krala, 49, kv. 54, all of Kharkov, U.S.S.R.

[22] Filed: Mar. 29, 1971

[21] Appl. No.: 128,853

[52] U.S. Cl. ................................. 310/64, 310/198
[51] Int. Cl. ............................................. H02k 1/32
[58] Field of Search ................. 310/54, 52, 59, 64, 310/58, 65, 213, 195, 198, 205, 201, 202

[56] References Cited
UNITED STATES PATENTS

| 3,046,424 | 7/1962 | Tudge | 310/64 |
|---|---|---|---|
| 3,476,961 | 10/1971 | Heard | 310/54 |
| 3,214,617 | 10/1965 | Tudge | 310/64 |
| 2,965,775 | 12/1960 | Archer | 310/64 |
| 3,497,737 | 2/1970 | Philofsky | 310/54 |
| 3,075,104 | 1/1963 | Willyoung | 310/54 |

FOREIGN PATENTS OR APPLICATIONS

| 1,363,968 | 5/1964 | France | 310/64 |
|---|---|---|---|
| 1,556,165 | 1/1969 | France | 310/64 |
| 998,569 | 7/1965 | Great Britain | 310/64 |

*Primary Examiner*—R. Skudy
*Attorney*—Waters, Roditi, Schwartz & Nissen

[57] ABSTRACT

Liquid-cooled rotor windings for turbo-alternators including an electrical-machine rotor winding with internally liquid-cooled conductors composed of a number of concentrically arranged coils, in which the cooling-liquid inlet and outlet taps are located between the coils in the coil ends of the winding, and the bends of the coils whereto said taps are connected are made more gradual than the adjacent bends of the next coils, while being made more gradual are the bends of turns of the coils placed below the turns of the coils onto which the taps are connected.

1 Claim, 5 Drawing Figures

ROTOR WINDING FOR AN ELECTRICAL MACHINE

The present invention relates to electrical machines, and more specifically to liquid-cooled rotor windings for turbo-alternators.

In the prior art, there are electrical-machine rotor windings with internally liquid-cooled conductors, made of concentrically arranged coils in which cooling-liquid inlet and outlet taps on the turns are placed between the coils, at the coil ends.

For convenient location of these inlet and outlet taps one has to increase the spacing between the coils in the axial direction, and this increases the overhang of the coil ends and, as a consequence, the length of the binding rings and the distance between the rotor supports.

An object of the present invention is to avoid these disadvantages.

A specific object of the invention is to provide an electrical-machine rotor winding with internally liquid-cooled conductors, which will reduce the overhang of the coil ends.

With these objects in view, the invention resides in that in an electrical-machine rotor winding with internally liquid-cooled conductors, composed of concentrically arranged coils in which cooling-liquid inlet and outlet taps on turns are placed between the coils in the coil ends, the coil turns below the tapped turns are, according to the invention, bent more gradually than the adjacent turns of adjacent coils.

This embodiment of the invention serves to reduce the distance between the rotor supports, owing to which the electrical machine has a smaller size and a lower weight.

Other objects and advantages of the present invention will be more fully understood from the following description of preferred embodiments when read in connection with the accompanying drawings, wherein.

Figure 1:
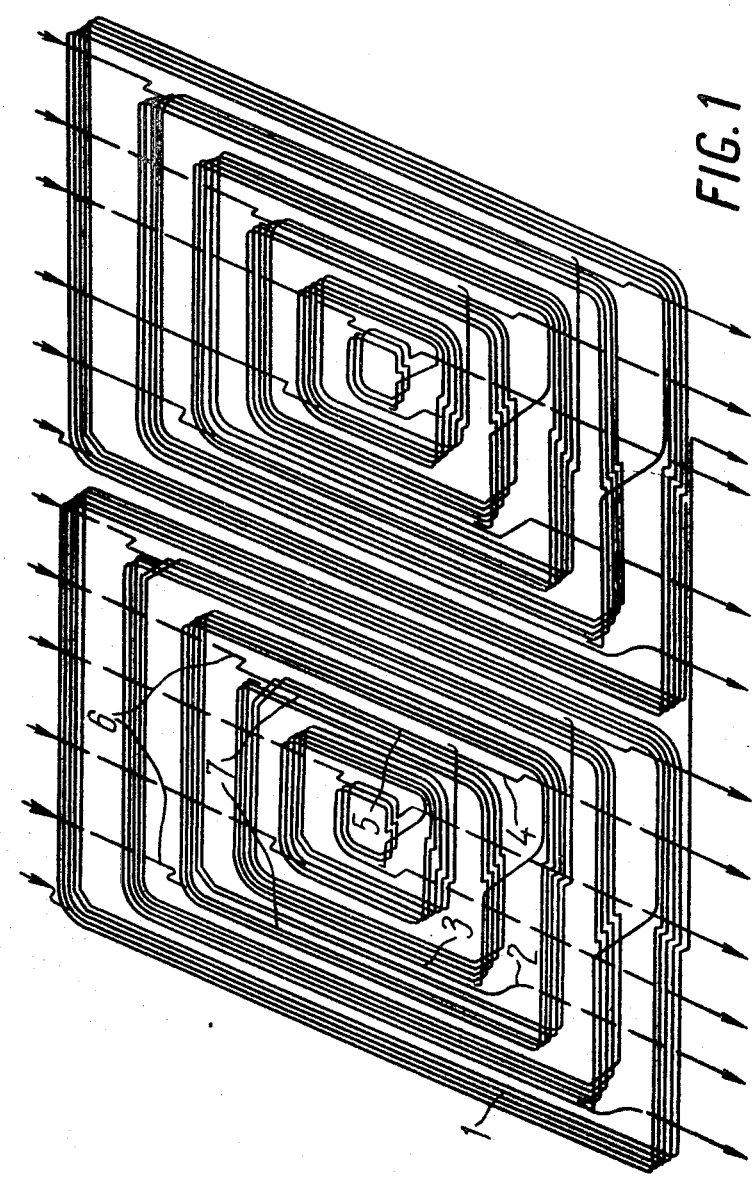
FIG. 1 is a sketch of a rotor winding in which cooling liquid is fed to each half-coil (the inlet and outlet directions of liquid are shown by the arrows)

Referring to FIG. 1, there is a rotor winding 1 composed of coils, with taps 2 on top turns 3 and taps 4 on lower turns 5 to let cooling liquid out of the winding, arranged all in one coil end.

Arranged in the other coil end are taps 6 to let cooling liquid into the middle turns 7 of the winding.

Figure 2:
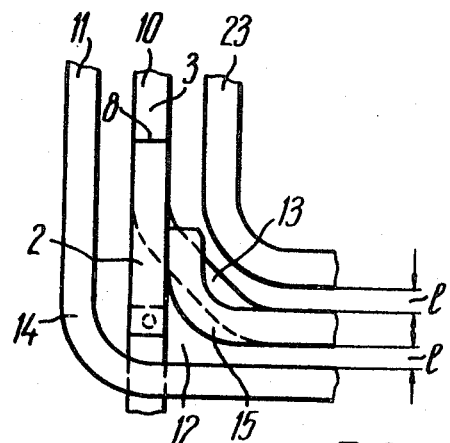
FIG. 2 is a top view of part of a winding at a place where a tap is attached to the top turn of a coil.
Figure 3:
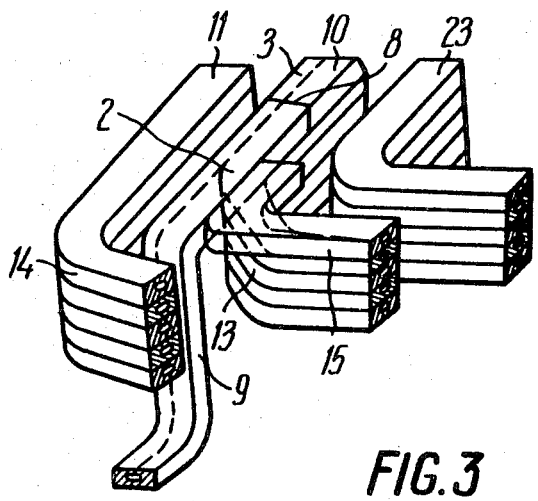
FIG. 3 is the same view in spatial presentation.

The taps 2 (FIGS. 2 and 3) are attached to the top turns 3 of the coils by soldering at places 8, and their segments 9 pass between coils 10 and 11 at their bends and in a clearance 12 which is enlarged owing to the fact that a bend 13 of the turns in the coil 10 at the place where the segment 9 of the tap 2 passes is made more gradual than a bend 14 of a succeding coil 11. In the accompanying drawings, the bend 13 is shown to have two radial steps with a straight segment between them, and the bend 14 is shown to have only on radial step.

To effect electrical and hydraulic connection of the winding coils, there is a strap 15 soldered to the taps 2.

Figure 4:
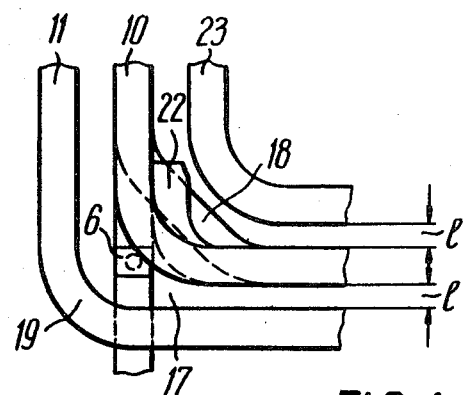
FIG. 4 is a top view of part of a winding at a place where a tap is attached to the middle turn of a coil.
Figure 5:
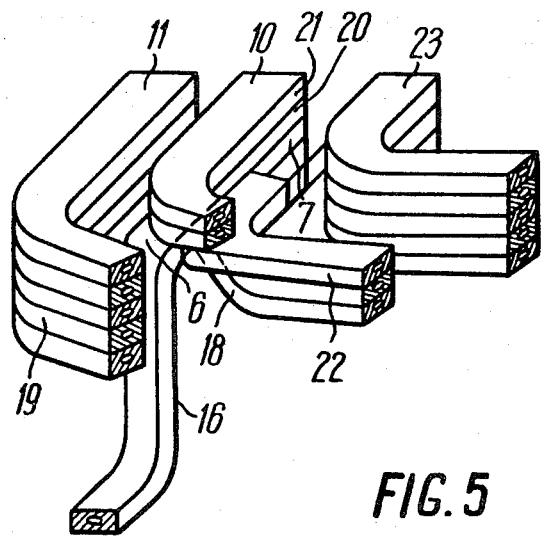
FIG. 5 is the same view in spatial presentation.

Segments 16 of the taps 6 (FIGS. 4 and 5) attached to the middle turns 7 of the coils pass at the other coil end between the coils 10 and 11 at their bends and in a clearance 17 which, as in the former case, is enlarged owing to the fact that the bend 18 of the coil 10 at the place where the segment 16 of the tap 6 passes is made more gradual than a bend 19 of the succeeding coil 11. At the same time, turns 20 and 21 lying above the tap 6 are bent in the same manner as all turns in the coil 11, while to the side surface of the turn 7 the succeeding turn 22 of the coil 10 is attached electrically and hydraulically.

With a rotor winding constructed as explained above, the corner clearances provided between the coils for the passage of the cooling-liquid inlet and outlet taps are increased, while the corner clearances between the tapped coil and the preceding coil 23 are reduced so that the distance "1" between the coil ends of the winding remains the same as with conventional coil ends and with coils in which all corners are bent similarly.

With the turns 20 and 21 which lie above the tap 6 attached to the middle turn of the coil, bent in the same way as all turns in the succeeding coil 11, there is a firm support for the tap 6 where it changes into the segment 16, and this reduces the mechanical stresses produced in it by centrifugal forces.

What is claimed is:

1. In an electrical-machine rotor with internally liquid-cooled conductors, comprising concentrically arranged bent coils; cooling-liquid inlet and outlet taps on said coils positioned between said coils in the coil ends of said rotor winding, the improvement comprising: the bends of the coil turns positioned below the tapped turns being made more gradual than the adjacent bends of turns in adjacent coils so as to form together with said adjacent adjoining coils an increased space for branching off.

* * * * *